(12) United States Patent
Hakamata et al.

(10) Patent No.: US 7,690,715 B2
(45) Date of Patent: Apr. 6, 2010

(54) OPEN-CLOSE PORTION STRUCTURE OF VEHICLE BODY

(75) Inventors: Koki Hakamata, Utsunomiya (JP); Tomofumi Ichinose, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 11/586,411

(22) Filed: Oct. 25, 2006

(65) Prior Publication Data

US 2007/0096502 A1   May 3, 2007

(30) Foreign Application Priority Data

Oct. 31, 2005   (JP)   ............... 2005-316554

(51) Int. Cl.
*B60J 5/10* (2006.01)
(52) U.S. Cl. ............... 296/106; 296/146.11; 296/146.8
(58) Field of Classification Search ............. 296/146.8, 296/11, 106, 56, 146.11, 50; 49/381–403
See application file for complete search history.

(56) References Cited

U.S. PATENT DOCUMENTS

| | | | |
|---|---|---|---|
| 5,986,420 A | 11/1999 | Kato | |
| 6,676,190 B2 * | 1/2004 | Daniels et al. | 296/106 |
| 6,698,821 B2 * | 3/2004 | Racz | 296/202 |
| 6,901,704 B2 * | 6/2005 | Sakaue et al. | 49/340 |
| 6,902,219 B2 * | 6/2005 | Hess et al. | 296/76 |
| 2002/0008400 A1 | 1/2002 | Hess et al. | |

FOREIGN PATENT DOCUMENTS

| | | |
|---|---|---|
| EP | 1154111 A2 | 11/2001 |
| JP | S58-27462 | 2/1983 |
| JP | 2001-199243 | 7/2001 |
| JP | 2005-075210 | 3/2005 |
| JP | 2005-075221 | 3/2005 |
| WO | WO 02/087912 A1 | 11/2002 |

* cited by examiner

*Primary Examiner*—Patricia L Engle
*Assistant Examiner*—Pinel E Romain
(74) *Attorney, Agent, or Firm*—Carrier, Blackman & Associates, P.C.; Joseph P. Carrier; William D. Blackman

(57) ABSTRACT

An open-close portion structure of a vehicle body includes: an open-close member which opens and closes an opening of the vehicle body; a first hinge member provided on the vehicle body; a second hinge member provided on the open-close member, being pivoted with the first hinge member; and a stretchable stay provided between the vehicle body and the open-close member and biasing the open-close member to open, wherein an end of the stretchable stay is coupled to the second hinge member.

13 Claims, 3 Drawing Sheets

OPEN-CLOSE PORTION STRUCTURE OF VEHICLE BODY

BACKGROUND OF THE INVENTION

1. Field of the Invention

The present invention relates to a structure of an open-close portion of a vehicle body such as a tailgate which opens and closes an opening of a vehicle body.

Priority is claimed on Japanese Patent Application No. 2005-316554, filed Oct. 31, 2005, the content of which is incorporated herein by reference.

2. Description of the Related Art

Vehicles such as station wagons and vans have a flip-up tailgate. These vehicles are adapted to load and unload from its opening at the backside by lifting the tailgate (see, for example, Japanese Unexamined Patent Application, First Publication No. 2005-75210).

The tailgate is mounted on the top end of the opening by a hinge which is rotatable, and a stretchable stay is provided between the vehicle body and the tailgate. The stay is provided for making opening of the tailgate easier and for keeping the tailgate open. The stay usually includes a gas spring having a damper function, and biases the tailgate to open by the pressure of the filler gas.

The hinge has a constitution of a vehicle body hinge member and a tailgate hinge member being pivoted by a hinge pin. The vehicle body hinge member is provided in a groove extending along a joining portion of a roof panel and a side panel of the vehicle body. This is to enable the tailgate to open at a large degree without interference with the back end of the roof panel.

However, the hinge and the stay have to be mounted separately in these conventional open-close portion structures. This increases the number of components of the structure and makes the mounting operation more complex. That is, the tailgate hinge member is mounted on the upper end of the side of the tailgate, and a bracket for mounting the stay is mounted on the side of the tailgate, being away from the tailgate hinge member. This has been a cause of the increase of components and the complexity of the mounting operation.

SUMMARY OF THE INVENTION

An object of the present invention is to provide a structure of an open-close portion of a vehicle body, the structure of which can reduce the number of components required and is easy to attach, by mounting a hinge and a stretchable stay on an open-close member via a common member.

A first aspect of the present invention is an open-close portion structure of a vehicle body including: an open-close member which opens and closes an opening of the vehicle body; a first hinge member provided on the vehicle body; a second hinge member provided on the open-close member, being pivoted with the first hinge member; and a stretchable stay provided between the vehicle body and the open-close member and biasing the open-close member to open, wherein an end of the stretchable stay is coupled to the second hinge member.

Due to the aforementioned constitution, an end of the stretchable stay is mounted on the open-close member via the second hinge member mounted on the open-close member. It becomes easier to set the point on which the load from the stretchable stay is applied near the rotational center of the open-close member, and the second hinge member prevents the deformation of the open-close member due to the load applied by the stretchable stay.

The second hinge member may be made of a plate member and provided on a side surface of the open-close member which is perpendicular to a rotation axis of the open-close member.

In this case, in at least a portion of the second hinge member which covers the open-close member, the load from the stretchable stay is applied from a direction perpendicular to the thickness of the second hinge member.

A second aspect of the present invention is an open-close portion structure of a vehicle body having a roof panel and a side panel including: a tailgate which opens and closes an opening of the vehicle body; a first hinge member provided in a groove extending along a joint portion of the roof panel and the side panel; a second hinge member provided on the tailgate, being pivoted with the first hinge member; and a stretchable stay provided between the vehicle body and the tailgate, biasing the tailgate to open, wherein an end of the stretchable stay is coupled to the second hinge member.

Due to the aforementioned constitution, an end of the stretchable stay is mounted on the tailgate via the second hinge member mounted on the tailgate. It becomes easier to set the point on which the load from the stretchable stay is applied near the rotational center of the tailgate, and the second hinge member prevents the deformation of the tailgate due to the load applied by the stretchable stay. In addition, since the first hinge member is mounted on the groove provided at both ends of the roof of the vehicle body, the stretchable stay can be mounted sufficiently near the side wall of the opening of the vehicle body.

The second hinge member may be made of a plate member and provided on a side surface of the tailgate which is perpendicular to a rotation axis of the tailgate.

In this case, in at least a portion of the second hinge member which covers the tailgate, the load from the stretchable stay is applied from a direction perpendicular to the thickness of the second hinge member.

The second hinge member may have a strip portion which extends to a position away from the side surface, and the end of the stretchable stay may be coupled to the strip portion. In this case, the mounting position of the stretchable stay is not restricted by the tailgate.

The second hinge member may have a step portion which bends toward the inside of the opening, and the strip portion may extend from the step portion.

In this case, the side of the tailgate on which the second hinge member is mounted can be offset in the width direction of the vehicle body to the portion of the second hinge member on which the stretchable stay is mounted.

The second hinge member may have an extended portion which extends on the side surface, and the end of the stretchable stay may be coupled to the extended portion.

DETAILED DESCRIPTION OF THE INVENTION

Figure 2:
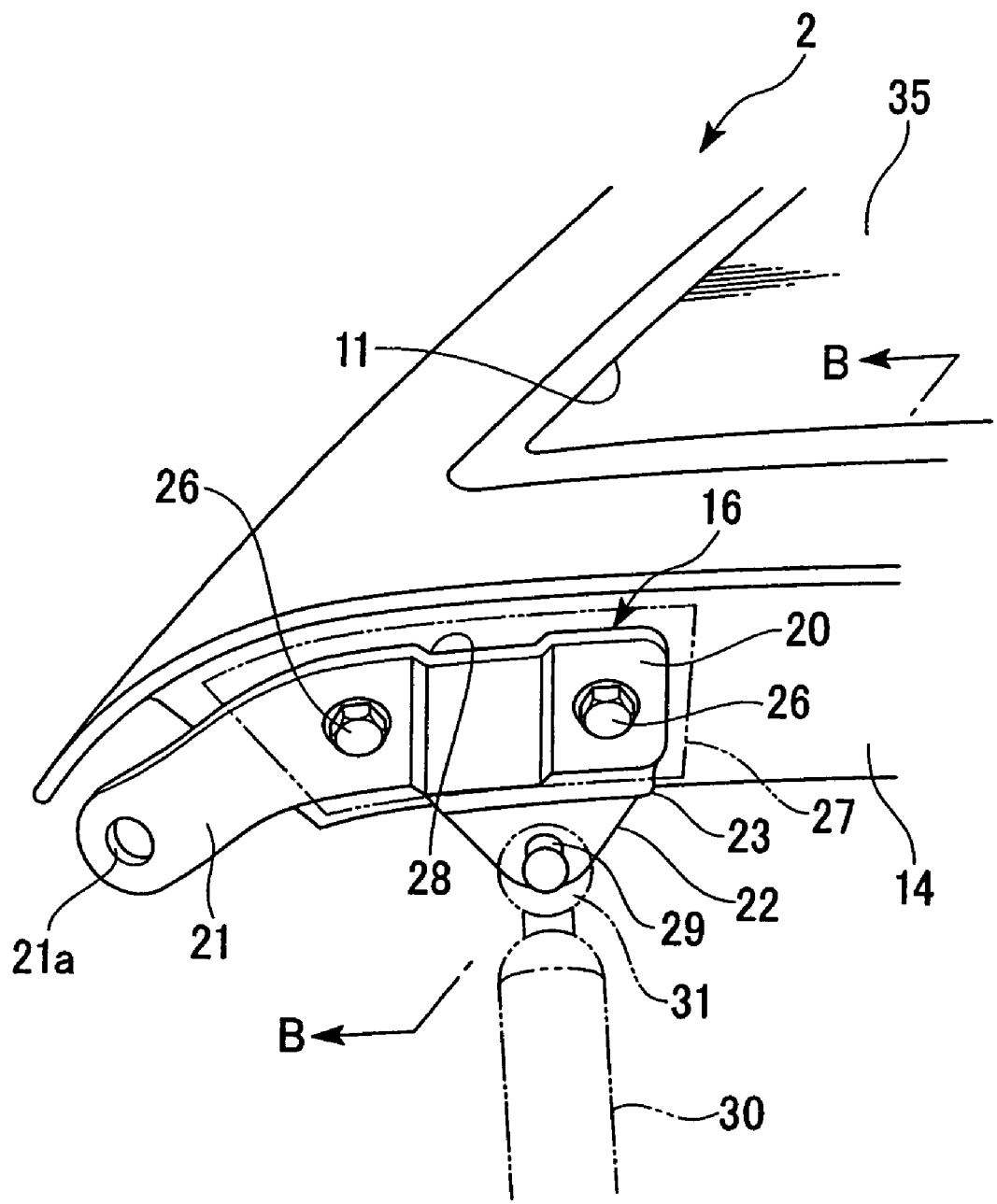
FIG. 2 is an enlarged perspective view of the portion A in FIG. 1.
Figure 3:
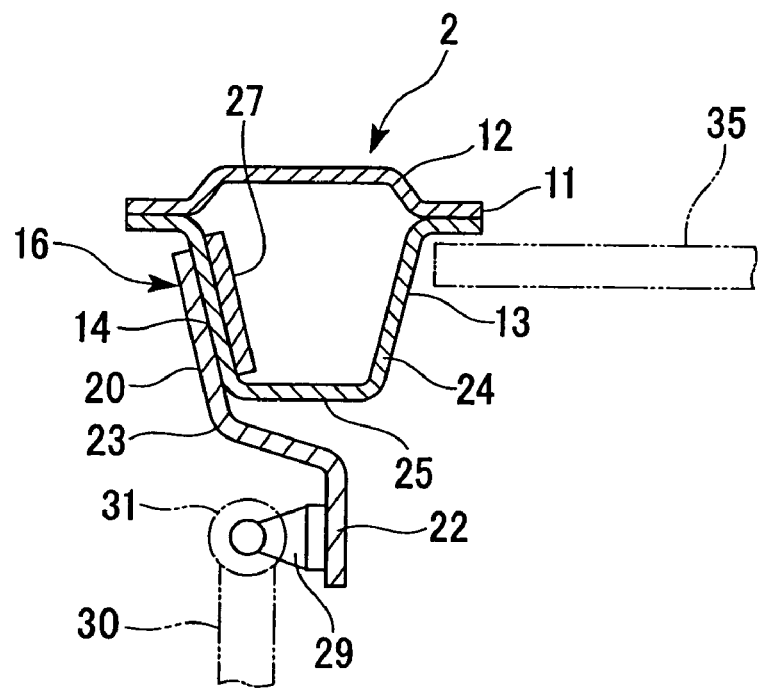
FIG. 3 is a cross sectional view along line B-B in FIG. 2.
Figure 4:
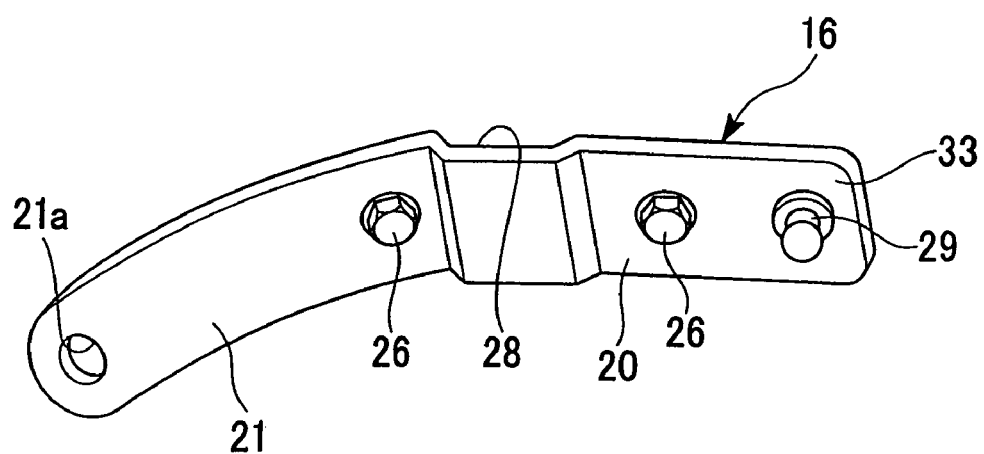
FIG. 4 is an enlarged perspective view of a member used in another embodiment of the present invention.

An embodiment of the present invention shall be described with reference to FIGS. 1 to 3. In the following description, terms "front" and "rear" respectively indicate front and rear in a traveling direction of a vehicle, and terms "upper" and "lower" respectively indicate upper and lower in the vertical direction, unless a different definition is presented.

Figure 1:
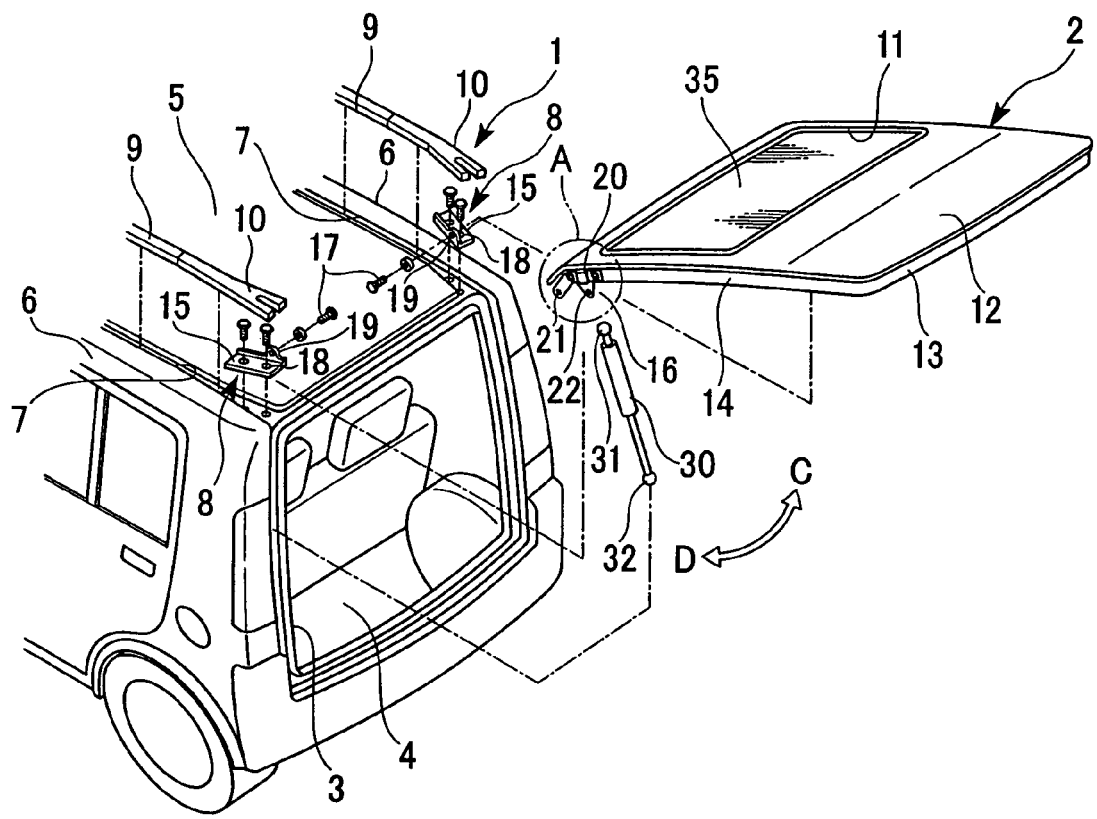
FIG. 1 is an exploded perspective view of a backside of a vehicle according to the first embodiment of the present invention.

A vehicle 1 shown in FIG. 1 is a station wagon having a tailgate 2 (an open-close member) on the rear portion thereof. The tailgate 2 is mounted rotatably in the vertical direction on an opening 3 provided at the backside of the vehicle 1. A back end of a roof portion of the vehicle 1 functions as a rotational axis of the tailgate 2. A baggage space 4 is provided in the cabin near the opening 3, and is adapted to be loaded and unloaded by opening the tailgate 2.

In the roof portion of the vehicle 1, top ends of side panels 6 which constitute side surfaces of the vehicle 1 are spot welded to both ends of a roof panel 5 disposed at the center in the width of the vehicle 1. The ends of the roof panel 5 and the side panels 6 which are welded to each other are bent to form a crank. Therefore, grooves 7 having a U-shaped cross section are formed along the longitudinal direction of the vehicle 1 after the roof panel 5 and the side panels 6 are welded. The grooves 7 are formed on the right and left ends of the roof portion.

The width of each groove 7 gradually increases toward the back end of the vehicle body. A hinge 8 is mounted on the bottom of a portion of the groove 7 which has a greater width, and rotatably supports the tailgate 2.

A roof molding 9 is mounted on each groove 7, and a hinge molding 10 which covers the hinge 8 is integrally formed at the back end of the roof molding 9.

A window 11 is formed in the upper half of the tailgate 2, and a tailgate glass 35 is mounted on the window 11. The tailgate 2 is constituted by integrating an outer panel 12 and an inner panel 13 by a hemming process. The edge of the outer panel 12 is folded on the inner panel 13, and the inner panel 13 bulges from the portion where the outer panel 12 is folded to the cabin side. The bulge of the inner panel 13 constitutes the thickness of the tailgate 2.

In other words, side surfaces 14 of the tailgate 2 are formed by the bulge of the inner panel 13 and are located inside from the edge of the outer panel 12 in the width direction by the length of the hemming process. The side surfaces 14 extend to be perpendicular to the rotational axis of the tailgate 2. The rotation of the tailgate 2 is indicated by arrows C and D shown in FIG. 1.

The hinge 8 for mounting the tailgate 2 on the vehicle body includes a first hinge member 15 and a second hinge member 16. The first hinge member 15 is mounted on the bottom of the groove 7, at the back end thereof, and the second hinge member 16 is mounted on the side surface 14, near the top end of the tailgate 2. The first hinge member 15 and the second hinge member 16 are pivoted by a hinge pin 17.

The first hinge member 15 is made of a metal plate member having an L-shaped cross section and has a base portion 18 and a support strip portion 19. The base portion 18 is mounted on the bottom of the groove 7 by a bolt, and the support strip portion 19 is formed at the rear end of the base portion to protrude upward. The first hinge member 15 and the second hinge member 16 are coupled at the support strip portion 19 via the hinge pin 17.

The second hinge member 16 is made of a metal plate member and has a base portion 20, a coupling portion 21, and a strip portion 22. The base portion 20 is mounted on the side surface 14 by a bolt. The coupling portion 21 extends from an end of the base portion 20 toward the upper front of the tailgate 2 and substantially parallel to the side surface 14, and forms an approximately L-shape with the base portion 20. The strip portion 22 extends from the base portion 20 toward the cabin side of the tailgate 2. The second hinge member 16 and the first hinge member 15 are coupled at the front end of the coupling portion 21 (an aperture 21a shown in FIG. 2) via the hinge pin 17. The base portion 20 and the coupling portion 21 are made almost plane, and a step portion 23 is provided between the base portion 20 and the strip portion 22 as shown in FIG. 3. This step portion 23 extends from the side surface 14 near a window frame 24 of the tailgate 2 over a backside 25 of the window frame 24. Therefore, the strip portion 22 extends at a position which is offset to the side surface 14 and nearer the center of the vehicle 1 in the width direction.

The base portion 20 is mounted on the side surface 14 of the tailgate 2 (the inner panel 13) by a bolt 26, and a stiffener 27 for increasing the support strength of the second hinge member 16 is joined on the other side of the portion of the inner panel 13 on which the base portion 20 is mounted. Reference numeral 28 in FIG. 2 indicates a U-shaped groove for drainage formed at approximately the center of the base portion 20 in its longitudinal direction.

A pin 29 protruding outside in the width direction of the vehicle body is provided on the strip portion 22 of the second hinge member 16, and a first end 31 of a stretchable stay 30 (hereinafter, simply referred to as "stay") for supporting the tailgate is rotatably coupled to the pin 29. The stay 30 has a gas spring having a damper function and a second end 32 of the stay 30 is rotatably coupled to the side edge of the opening 3 of the vehicle body. The stay 30 biases the tailgate 2 to open by the pressure of the filler gas of the gas spring. Though only the stay 30 on the left side of the tailgate 2 is shown in FIG. 1, another stay 30 is also mounted on the right side of the tailgate 2 in the same manner.

Since the first end 31 of the stay 30 is coupled to the second hinge member 16, the number of components can be reduced and make the mounting operation easier than that of the conventional structure, in which a bracket is mounted on the tailgate 2 and the stay 30 is coupled to the tailgate 2 via the bracket. Therefore, manufacturing cost can be saved by the present structure.

In addition, since a portion to be coupled with the stay 30 is integrally provided in the second hinge member 16, it can be easier to set a point on which the load from the stay 30 is applied near the rotational center of the tailgate 2. Therefore, it can be possible to constitute a structure in which the load applied from the stay does not work as a great bending moment to the open-close member. Furthermore, the tailgate 2 can be reinforced by the second hinge member 16 so as to prevent the deformation of the tailgate 2 due to the load applied by the stay 30. Since the tailgate is not bent by the bias of the stay 30 in the present structure, fitting adjustment of the tailgate 2 can be reduced.

In the present embodiment, the strip portion 22 for coupling the stay 30 extends from the base portion 20 toward the cabin side of the tailgate 2. Therefore, the deformation of the tailgate 2 is more effectively prevented by setting the mounting portion of the stay 30 closer to the rotational center of the tailgate 2.

Since the portion for coupling the stay 30 is integrated with the second hinge member 16 in the present structure, the area of the stiffener 27 for reinforcing the inner panel 13 of the tailgate 2 can be reduced.

In the present structure around the tailgate 2 of the vehicle, the base portion 20 of the second hinge member 16 made of a plate member is connected to the side surface 14 of the tailgate 2 which is perpendicular to the rotational axis of the tailgate 2. Since the load from the stay 30 is applied on the connecting area of the second hinge member 16 and the tailgate 2 from the direction which is perpendicular to the thickness of the second hinge member 16, the second hinge member 16 can receive the load from the stay 30 from a direction to which the second hinge member 16 has a greater strength. The load from the stay 30 is applied from a shearing direction at the coupling portion of the second hinge member 16 and the tailgate 2.

In the present embodiment, the first hinge member 15 is mounted in the groove 7 on the right-and-left side of the roof of the vehicle body, and the first end 31 of the stay 30 is coupled to the second hinge member 16 which is supported by the first hinge member 15. Therefore, the stay 30 can be disposed sufficiently near the right-and-left side edge of the opening 3 of the vehicle body. As a result, the stay 30 does not obstruct the loading and unloading from the opening 3, and the space of the opening 3 of the vehicle body can be sufficiently maintained.

In this embodiment, since the strip portion 22 extends from the base portion 20 of the second hinge member 16 toward the cabin side of the tailgate 2 and the first end 31 of the stay 30 is coupled to the strip portion 22, the mounting position of the stay 30 is not restricted by the side surface 14 of the tailgate 2. Therefore, the layout flexibility of the stay can be improved.

Furthermore, since the step portion 23 is provided on the base portion 20 of the second hinge member 16 over the side surface 14 and the backside 25 and the strip portion 22 extends from the step portion 23, the first end of the 31 of the stay 30 is disposed at a position which is offset to the side surface 14 of the tailgate 2 and nearer the center of the vehicle 1 in the width direction. The window frame 24 of the tailgate 2 thus can be disposed closer to the side wall of the vehicle body without reducing the cross section of the window frame 24.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. For example, though the strip portion 22 extending toward the cabin side of the tailgate 2 is integrally provided on the base portion 20 of the second hinge member 16 in the present embodiment, the base portion 20 may be extended along the side surface 14 of the tailgate 2 (an extended portion 33) instead of providing the strip portion 22. In this case, a coupling portion for coupling the stay 30 is provided in the extended portion 33 of the base portion 20.

Accordingly, the invention is not to be considered as being limited by the foregoing description, and is only limited by the scope of the appended claims.

What is claimed is:

1. An open-close portion structure of a vehicle body, said open-close portion structure comprising:
    an open-close member which opens and closes an opening of the vehicle body to provide selective access to an interior cabin of the vehicle body, the open-close member being pivotally movable about a rotational axis thereof and having a side surface which is disposed substantially perpendicular to said rotational axis, and a cabin-side surface which faces toward the interior cabin when the open-close member is closed;
    a first hinge member provided on the vehicle body;
    a second hinge member provided on the open-close member, said second hinge member being operatively attached to said side surface of the open-close member and pivotally connected to the first hinge member; and
    a stretchable stay provided between the vehicle body and the open-close member and biasing the open-close member to open,
    wherein:
    the second hinge member comprises:
        a base portion which is operatively attached to the side surface of the open-close member;
        a strip portion which is operatively attached to the base portion and extends to a position away from the side surface, said strip portion being positioned away from the cabin-side surface of the open-close member, and configured to extend into the interior of the vehicle body when the open-close member is closed, and
        a coupling portion which is integrally formed with the base portion and is pivotally connected to the first hinge member;
    a first end of the stretchable stay is operatively connected to the to the strip portion of the second hinge member, whereby the biasing force of the stay is indirectly transferred to the open-close member via the second hinge member, and
    a second, opposing end of the stretchable stay is disposed below the first end of the stretchable stay and is operatively attached to a side edge of the vehicle body, proximate the opening thereof the second hinge member comprising a plate member.

2. The open-close portion structure of a vehicle body according to claim 1, wherein the second hinge member is formed as a substantially integral metal plate.

3. The open-close portion structure of a vehicle body according to claim 1, wherein the base portion has a U-shaped groove formed therein at a longitudinally central portion thereof.

4. The open-close portion structure of a vehicle body according to claim 1, wherein the first end of the stretchable stay is coupled to the second hinge member at a point proximate the rotational axis of the open-close member.

5. The open-close portion structure of a vehicle body according to claim 1, wherein:
    the open-close member has a window and a window frame which is provided around the window,
    the base portion of the second hinge member has a step portion which bends toward an inside of the opening, and
    the strip portion is provided so as to be positioned inwardly of the window frame when the tailgate is closed and when viewed from a vantage point behind the vehicle body.

6. The open-close portion structure of claim 1, further comprising a stiffener which is operatively connected to the second hinge member and is disposed on an opposite side of the side surface of the open-close member from the second hinge member.

7. An open-close portion structure of a vehicle body having a roof panel and a side panel, said open-close portion structure comprising:
    a tailgate which opens and closes an opening of the vehicle body to provide selective access to an interior cabin of the vehicle body, the tailgate being pivotally movable about a rotational axis thereof and having a side surface which is disposed substantially perpendicular to said rotational axis, and a cabin-side surface which faces toward the interior cabin when the tailgate is closed;
    a first hinge member provided in a groove extending along a joint portion of the roof panel and the side panel;

a second hinge member provided on the tailgate, said second hinge member being operatively attached to said side surface of the tailgate and pivotally connected to the first hinge member; and a stretchable stay provided between the vehicle body and the tailgate, said stretchable stay biasing the tailgate to open, wherein:

the second hinge member comprises:

a base portion which is operatively attached to the side surface of the tailgate;

a strip portion which is operatively attached to the base portion and extends to a position away from the side surface, said strip portion also being positioned away from the cabin-side surface of the tailgate, and configured to extend into the interior of the vehicle body when the tailgate is closed, and a coupling portion which is integrally formed with the base portion and is pivotally connected to the first hinge member;

a first end of the stretchable stay is operatively connected to the strip portion of the second hinge member, whereby the biasing force of the stay is indirectly transferred to the tailgate via the second hinge member, a second, opposing end of the stretchable stay is disposed below the first end of the stretchable stay and is operatively attached to a side edge of the vehicle body, proximate the opening thereof, the second hinge member comprising a plate member, and a stiffener is joined on an opposite side of the side surface of the tailgate.

8. The open-close portion structure of a vehicle body according to claim 7, wherein the second hinge member has a step portion which bends from the base portion toward an inside of the opening, and the strip portion extends from the step portion.

9. The open-close portion structure of a vehicle body according to claim 8, wherein the tailgate has a window and a window frame which is provided around the window, and the strip portion is provided so as to be positioned inwardly of the window frame when the tailgate is closed and when viewed from a vantage point behind the vehicle body.

10. The open-close portion structure of a vehicle body according to claim 7, wherein the second hinge member is formed as a substantially integral metal plate.

11. The open-close portion structure of a vehicle body according to claim 7, wherein the base portion has a U-shaped groove formed therein at a longitudinally central portion thereof.

12. The open-close portion structure of a vehicle body according to claim 7, wherein the first end of the stretchable stay is coupled to the second hinge member at a point proximate the rotational axis of the open-close member.

13. An open-close portion structure configured to provide selective access to an interior cabin area of a vehicle body, said open-close portion structure comprising:

a tailgate which opens and closes an opening of the vehicle body, the tailgate being pivotally movable about a rotational axis thereof and having a side surface which is disposed substantially perpendicular to said rotational axis, and a cabin-side surface which faces toward the interior cabin when the tailgate is closed, wherein the tailgate has a window and a window frame which is provided around the window;

a first hinge member provided on the vehicle body;

a second hinge member provided on the tailgate, said second hinge member being operatively attached to said side surface of the tailgate and pivotally connected to the first hinge member; and a stretchable stay provided between the vehicle body and the tailgate, and biasing the tailgate to open, wherein:

the second hinge member comprises:

a base portion which is operatively attached to the side surface of the open-close member;

a step portion operatively attached to the base portion and which bends toward an inside of the opening, and the strip portion extends from the step portion a strip portion which is operatively attached to the base portion and extends to a position away from the side surface, said strip portion also being positioned away from the cabin-side surface of the open-close member, and configured to extend into the interior of the vehicle body when the tailgate is closed, and a coupling portion which is integrally formed with the base portion and is pivotally connected to the first hinge member;

a first end of the stretchable stay is coupled to the strip portion of the second hinge member, a second, opposing end of the stretchable stay is operatively attached to a side edge of the vehicle body, proximate the opening thereof, the second hinge member comprises a plate member, and the strip portion is provided so as to be positioned inwardly of the window frame when the tailgate is closed and when viewed from a vantage point behind the vehicle body.

* * * * *